(12) United States Patent
Shikata et al.

(10) Patent No.: US 8,446,533 B2
(45) Date of Patent: May 21, 2013

(54) TELEVISION APPARATUS AND METHOD FOR CONTROLLING THE SAME

(75) Inventors: Yasushi Shikata, Tama (JP); Takashi Yamamoto, Yamato (JP); Tomoyasu Yoshikawa, Kawasaki (JP); Katsuhiro Ito, Yokohama (JP); Tomoki Kuroda, Tokyo (JP); Kiyohiro Uemura, Tokyo (JP); Masaki Tamura, Kawasaki (JP); Masatsugu Sasaki, Kawasaki (JP); Kinshirou Suzawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 12/549,357

(22) Filed: Aug. 27, 2009

(65) Prior Publication Data

US 2010/0053471 A1    Mar. 4, 2010

(30) Foreign Application Priority Data

Aug. 29, 2008  (JP) ................. 2008-222021

(51) Int. Cl.
*H04N 5/60* (2006.01)
*H04N 5/765* (2006.01)
*H04N 9/80* (2006.01)
*H04R 5/00* (2006.01)

(52) U.S. Cl.
USPC ............. 348/738; 381/27; 386/231; 386/239

(58) Field of Classification Search
None
See application file for complete search history.

(56) References Cited

U.S. PATENT DOCUMENTS

2007/0133812 A1 * 6/2007 Yoshizawa et al. ............. 381/27
2008/0309830 A1 * 12/2008 Motomura .................... 348/738
2009/0284665 A1 * 11/2009 Mizoguchi et al. ........... 348/738

FOREIGN PATENT DOCUMENTS

| JP | 2007-267116 A | 10/2007 |
|---|---|---|
| JP | 2008-028950 A | 2/2008 |
| JP | 2009-027594 A | 2/2009 |

* cited by examiner

*Primary Examiner* — Jefferey Harold
*Assistant Examiner* — Sean Haiem
(74) *Attorney, Agent, or Firm* — Canon USA Inc IP Division

(57) ABSTRACT

In an AV system in which a television apparatus and a recorder are individually connected to an AV amplifier through an HDMI, in the case where sound is output from the AV amplifier, if insertion of headphones into the television apparatus is detected, control information to switch the destination of the audio data is transmitted from the television apparatus to the AV amplifier. The AV amplifier switches the destination of the audio data that is input from the recorder from a speaker output section to the television apparatus in accordance with the control information. Thus, even if the headphones are inserted into the television apparatus while the AV amplifier is outputting sound reproduced by the recorder, the sound can be output from the headphones.

12 Claims, 12 Drawing Sheets

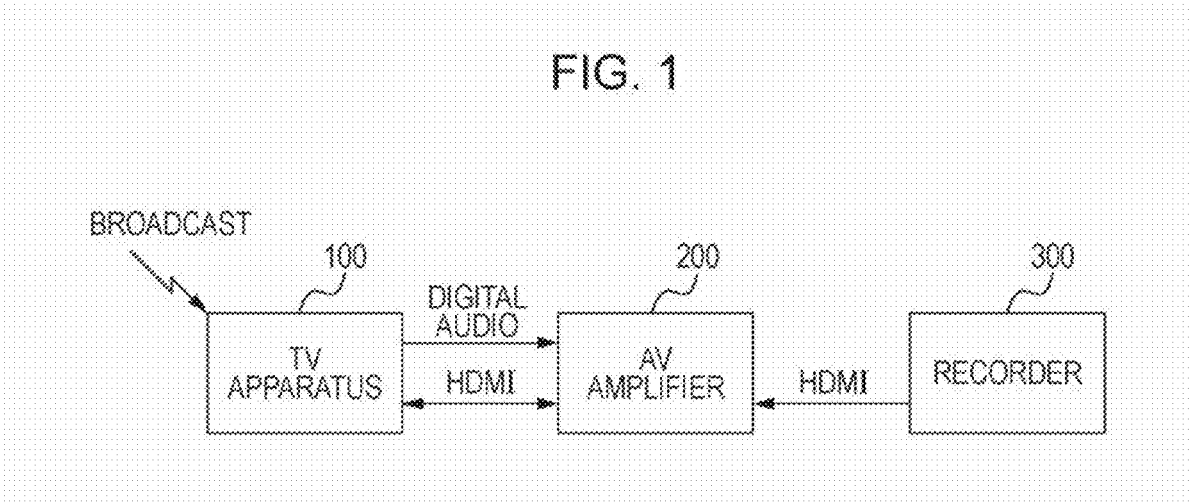

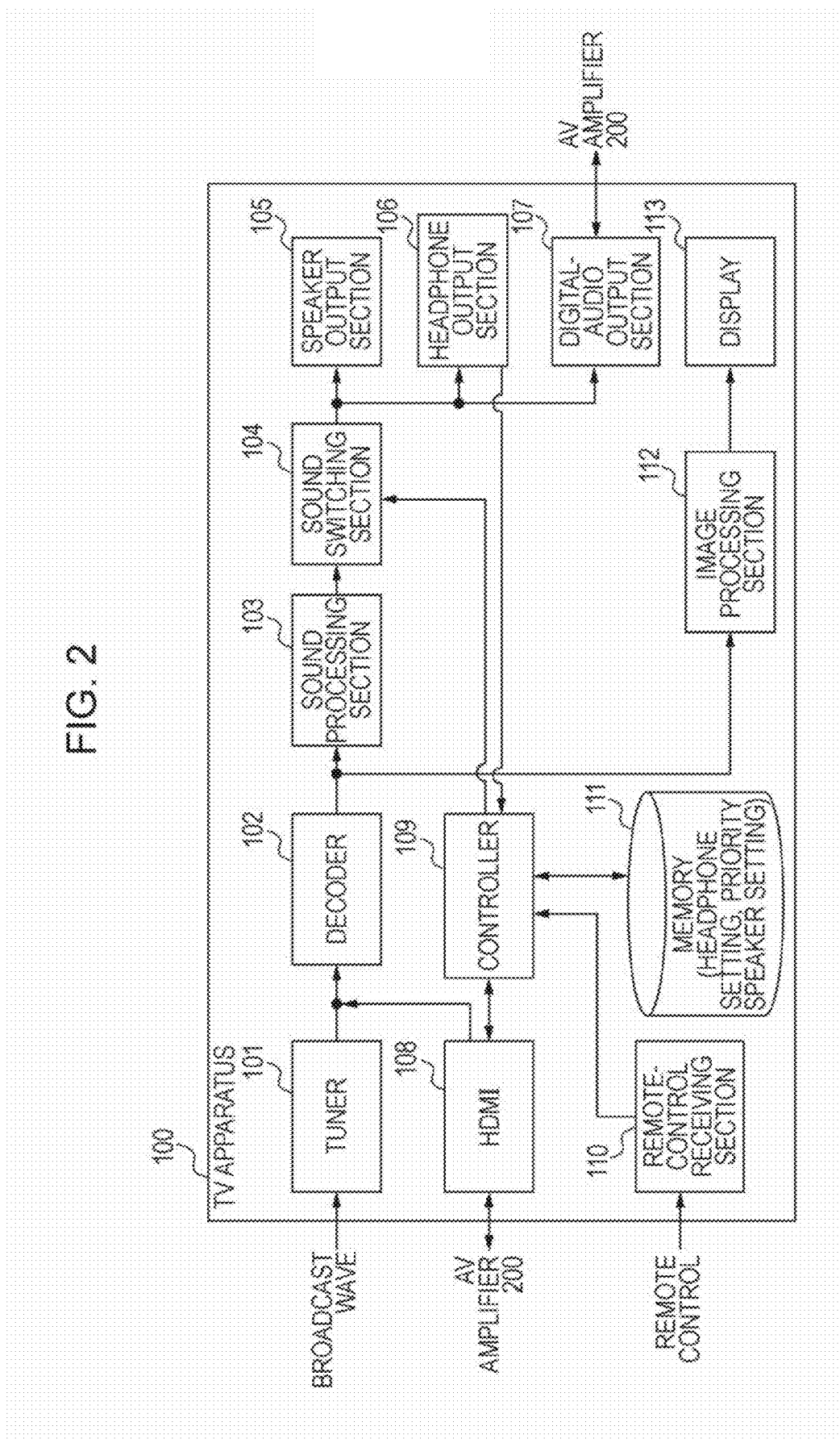

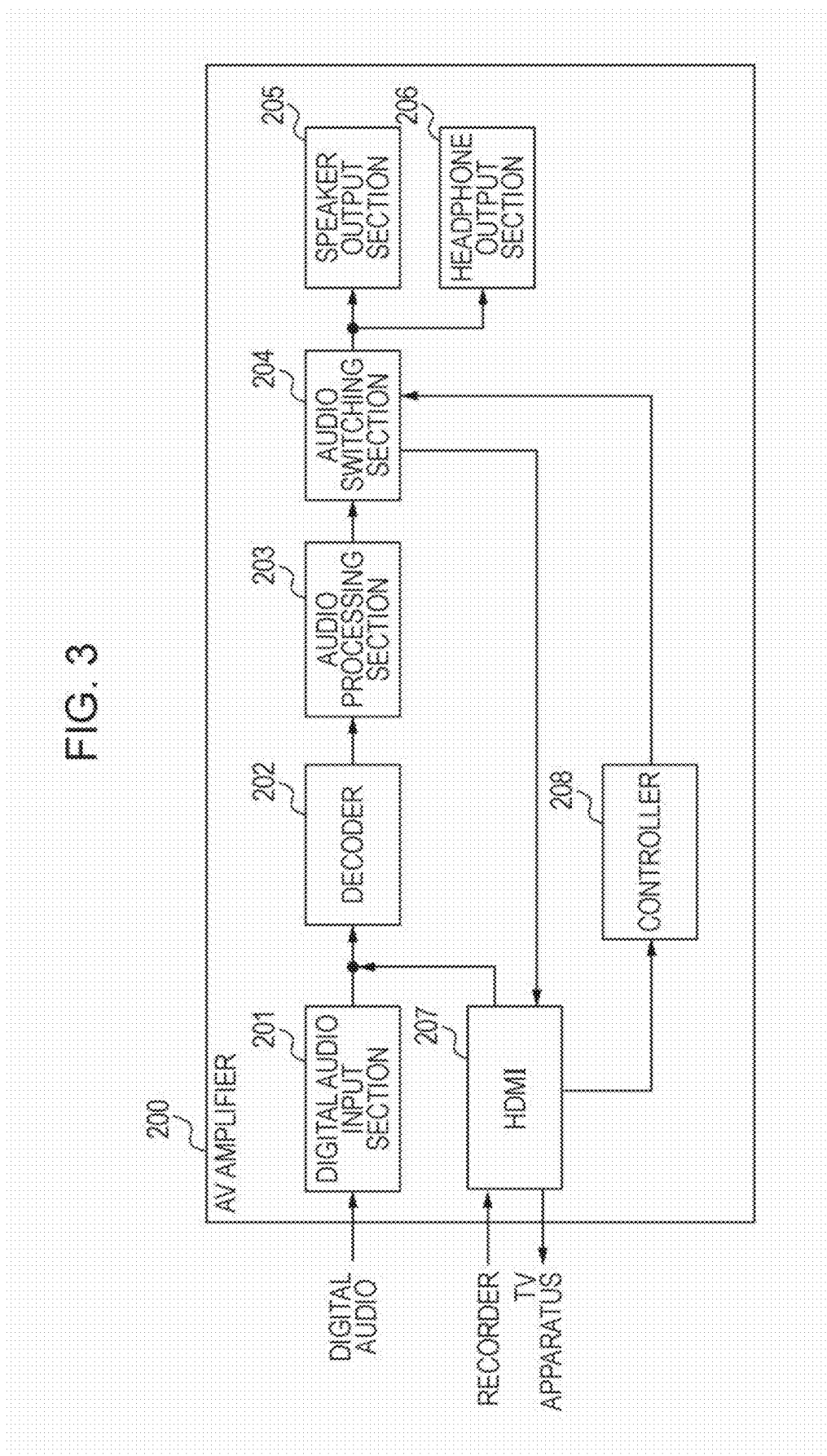

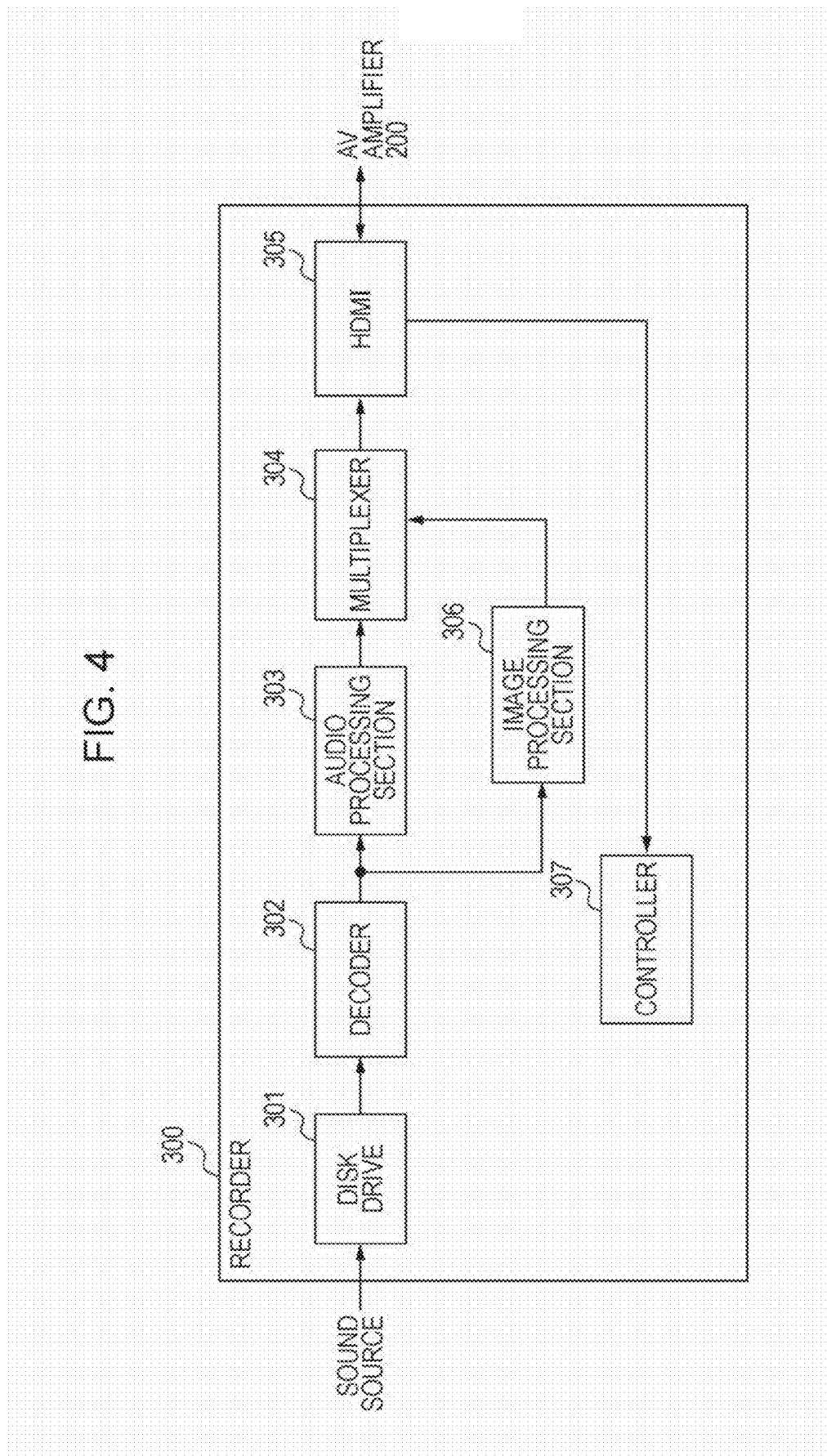

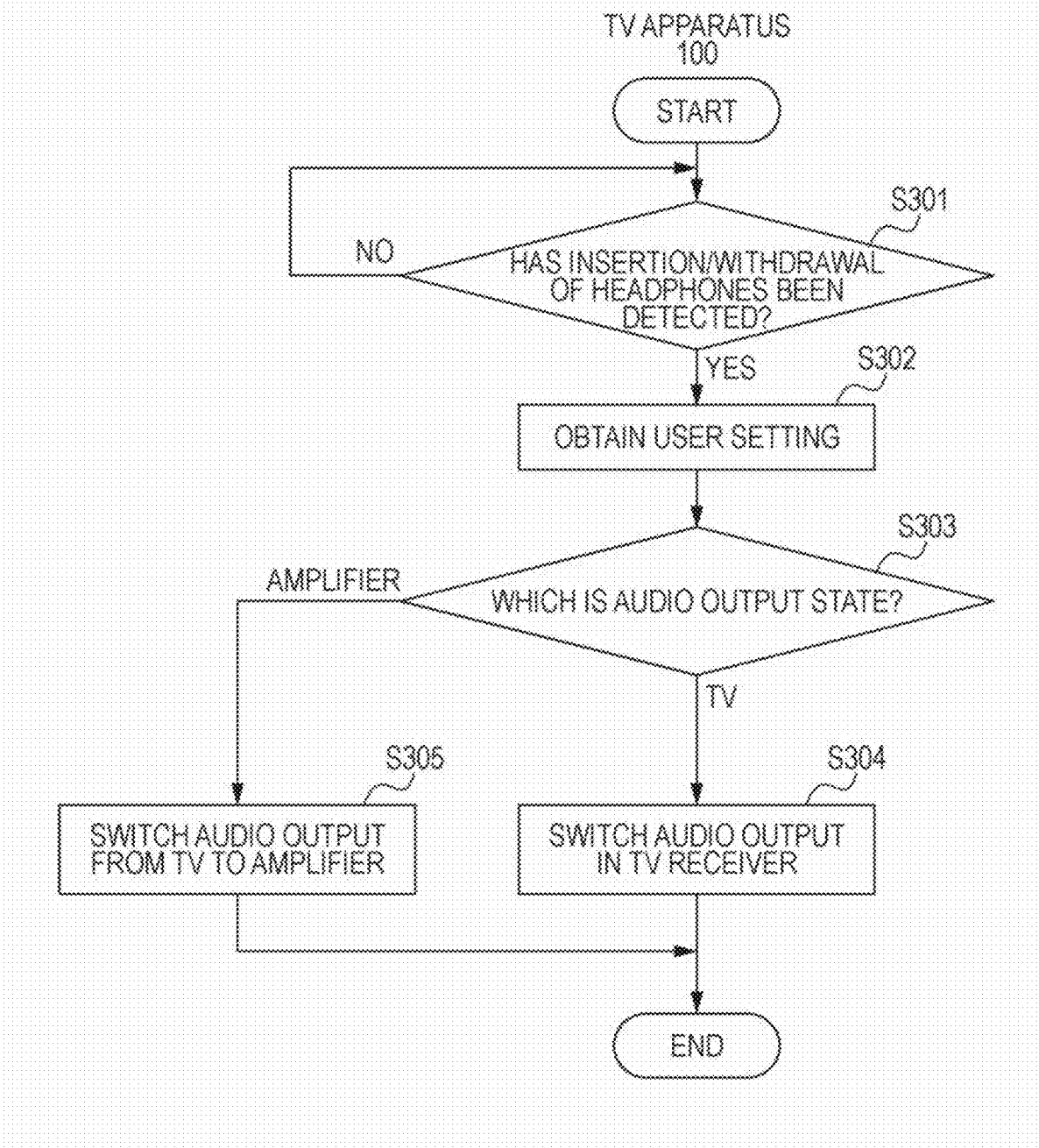

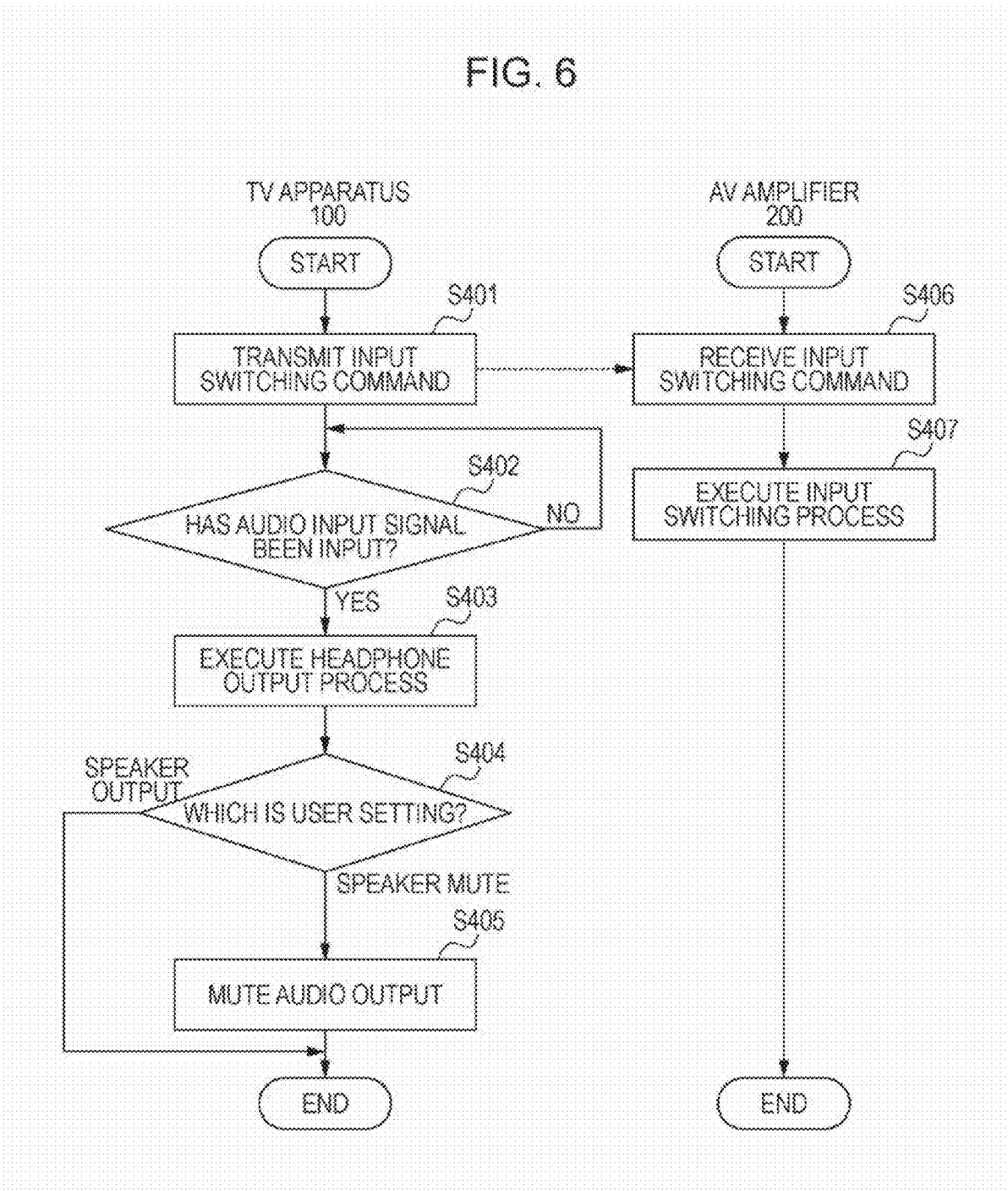

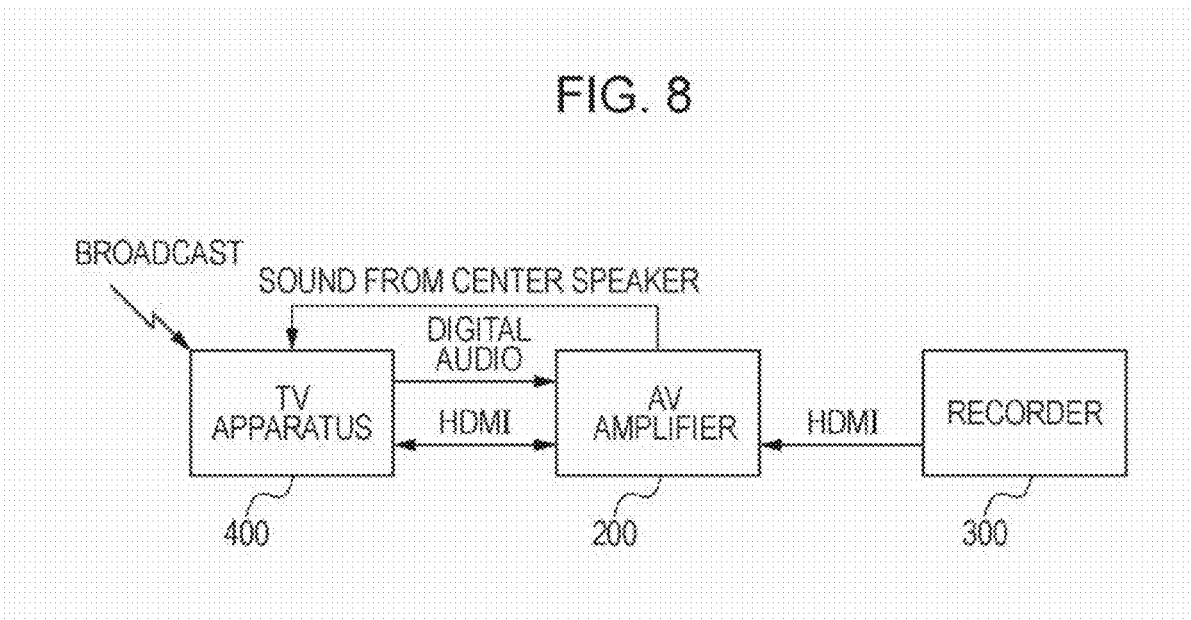

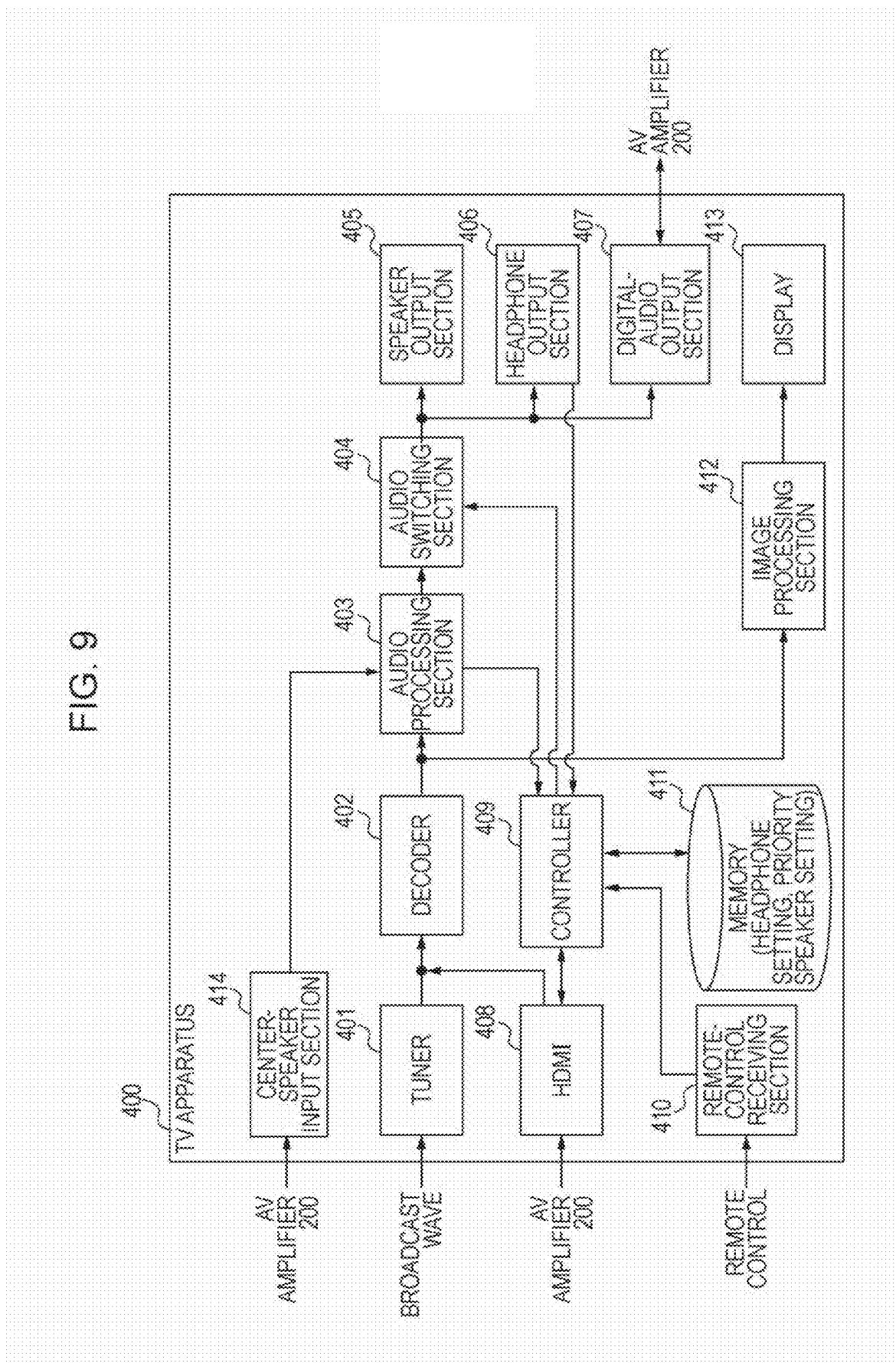

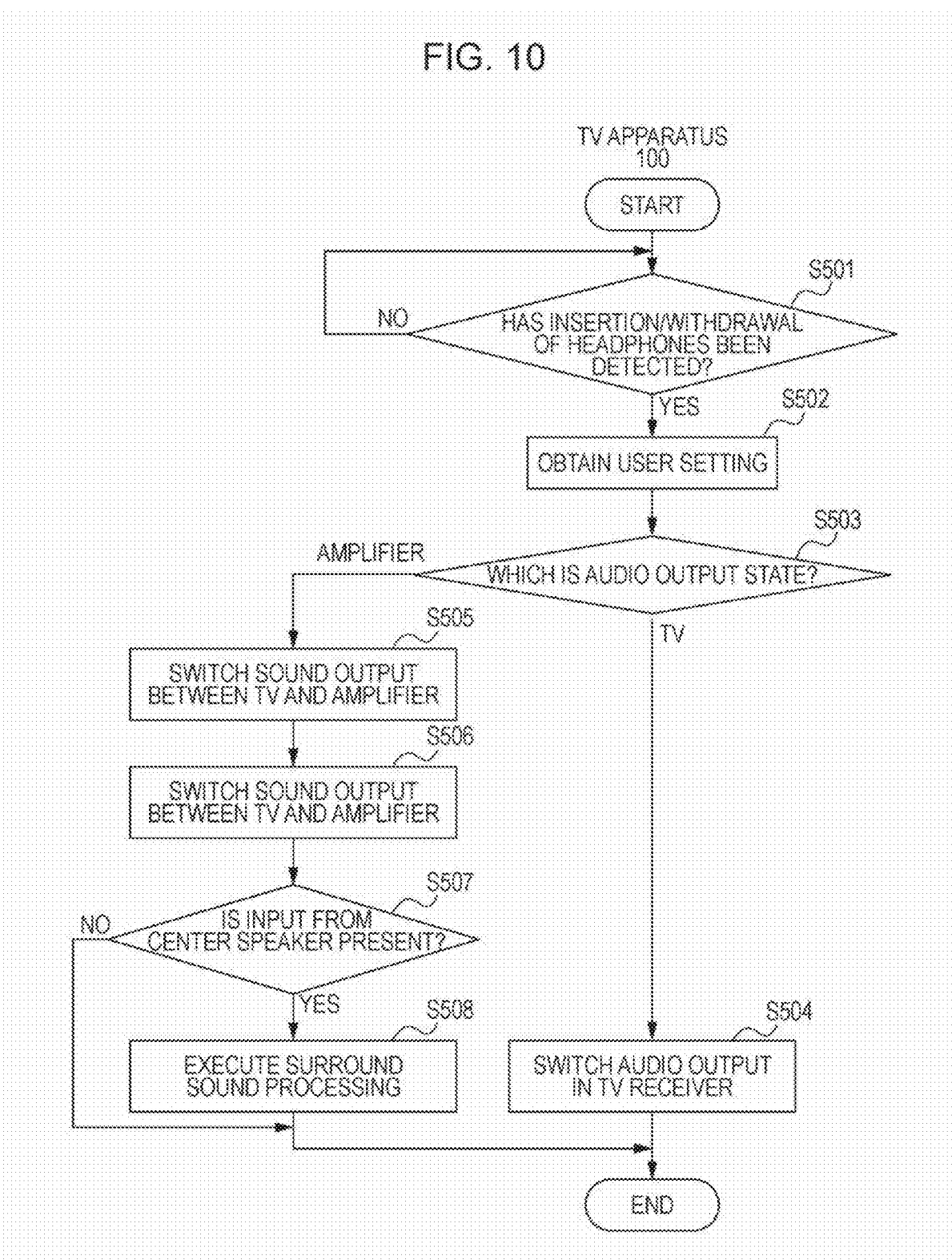

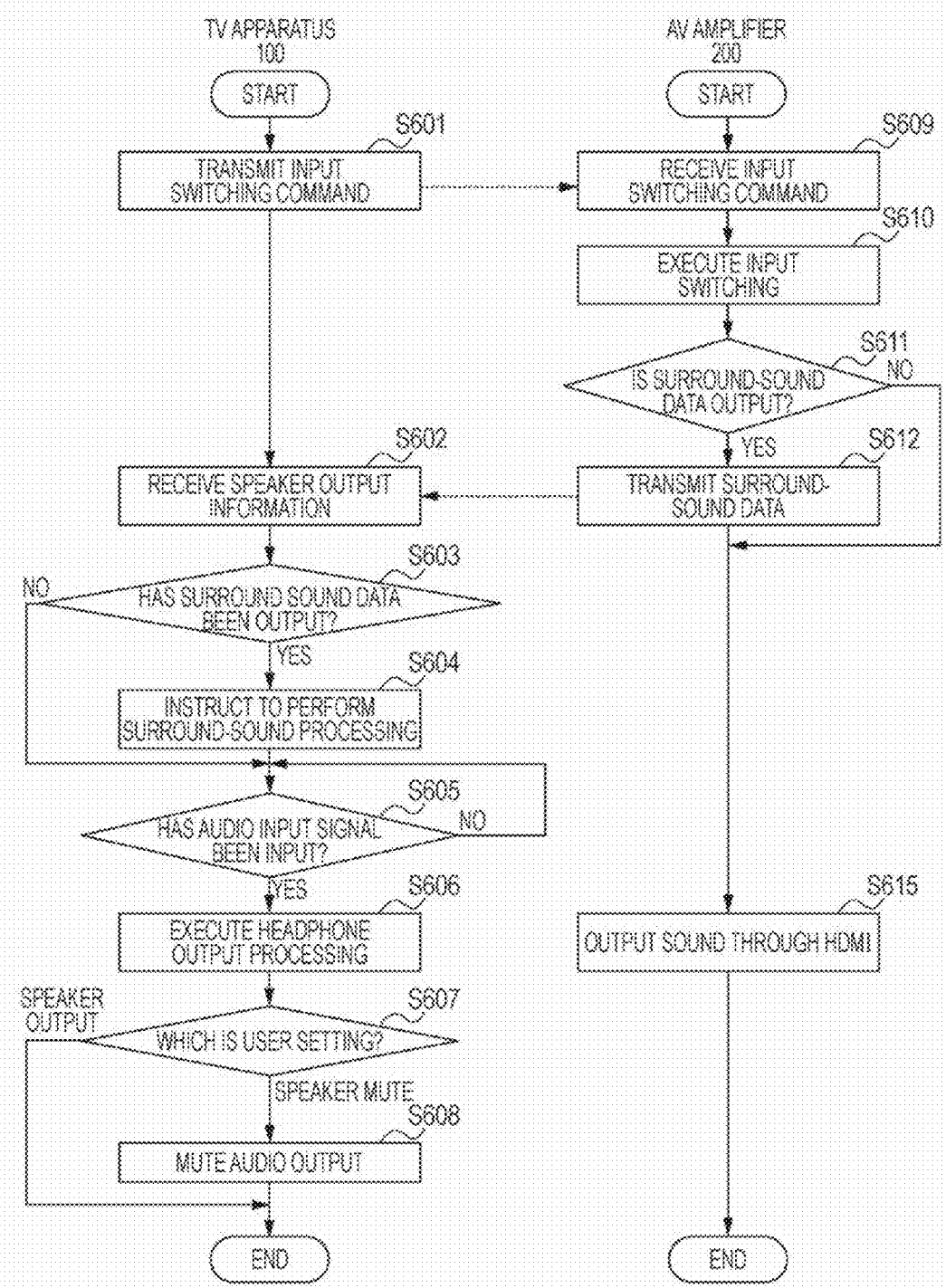

TELEVISION APPARATUS AND METHOD FOR CONTROLLING THE SAME

BACKGROUND OF THE INVENTION

1. Field of the Invention

The present invention relates to a television apparatus connectable to an audio-visual amplifier (AV amplifier) and a method for controlling the same.

2. Description of the Related Art

Communication standards for transmitting video or audio digital signals etc. between AV devices include a high definition multimedia interface (HDMI). This HDMI standard includes the consumer electronics control (CEC) which is a command transmitting and receiving function for mutual device control. In recent years, a system in which a television apparatus, an AV amplifier, and a recorder are connected together using the HDMI and can be controlled using a remote control of the television apparatus by the CEC is becoming widespread. As shown in FIG. 12A, users can control the switching of the output of an audio signal from a recorder between a speaker of a television apparatus and a speaker of an AV amplifier using the remote control of the television apparatus.

As shown in FIG. 12B, a form in which the television apparatus and the AV amplifier are connected to the recorder is also possible; however, the connection shown in FIG. 12A is desirable for HDMI connection. Japanese Patent Laid-Open No. 2007-267116 describes an AV apparatus with the system configuration shown FIG. 12B. It describes that a recorder, which is a transmission source, reads information on audio output stored in the extended display identification data (EDID) memories of both of the television apparatus and the AV amplifier and switches the destination of the audio signal.

Users sometimes make a mistake when listening with headphones because two sound output destinations, that is, a television apparatus and an AV amplifier, are present. That is, when sound is output from the AV amplifier, the sound is not sometimes output because the user inserted headphones into a headphone terminal of the television apparatus. In particular, with a separate type in which the display panel and the tuner of a television apparatus are separated, the tuner is often disposed next to an AV amplifier, so that the above-described mistake tends to occur.

SUMMARY OF THE INVENTION

In view of the above-described problems, the present invention provides a television apparatus that can output sound even if a user mistakes a device into which headphones to be inserted.

According to an aspect of the present invention, there is provided a television apparatus that can be connected to an audio apparatus that performs signal processing on input audio data to output sound, the television apparatus including a headphone output unit configured to detect insertion of headphones and to output audio data to the headphones; a communication unit configured to communicate with the audio apparatus; and a control unit configured to control the audio apparatus using the communication unit, wherein the control unit controls the audio apparatus so as to output audio data that has been input to the audio apparatus to the television apparatus if insertion of headphones is detected.

According to the aspect of the present invention, the user can listen to sound using headphones inserted in either the television apparatus or the AV amplifier television without thinking about the sound output state of the television apparatus and the AV amplifier.

Further features of the present invention will become apparent from the following description of exemplary embodiments with reference to the attached drawings.

BRIEF DESCRIPTION OF THE DRAWINGS

FIG. 1 is a configuration diagram of an AV system according to a first embodiment of the present invention.

FIG. 2 is a block diagram of a television apparatus according to the first embodiment of the present invention.

FIG. 3 is a block diagram of an AV amplifier according to the first embodiment of the present invention.

FIG. 4 is a block diagram of a recorder according to the first embodiment of the present invention.

FIG. 5 is a flowchart showing audio switching processing when headphones are inserted according to the first embodiment of the present invention.

FIG. 6 is a flowchart for TV-amplifier audio switching processing according to the first embodiment of the present invention.

FIG. 8 is a configuration diagram of an AV system according to a second embodiment of the present invention.

FIG. 9 is a block diagram of a television apparatus according to the second embodiment of the present invention.

FIG. 10 is a flowchart showing audio switching processing when headphones are inserted according to the second embodiment of the present invention.

FIG. 11 is a flowchart for TV-amplifier audio switching processing according to a third embodiment of the present invention.

DESCRIPTION OF THE EMBODIMENTS

Figure 7A:
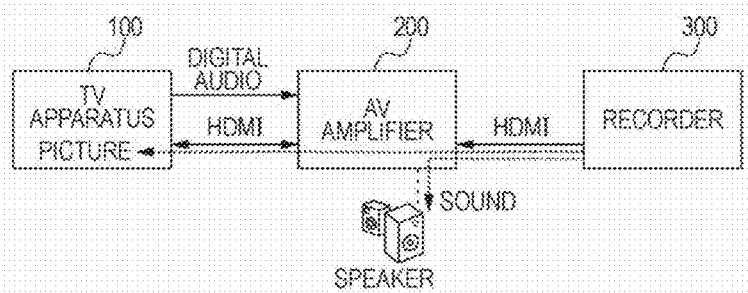
FIG. 7A is a diagram illustrating an audio transfer path according to the first embodiment of the present invention.

Embodiments of the present invention will be described hereinbelow.

First Embodiment

FIG. 1 is a configuration diagram of an AV system according to a first embodiment of the present invention. This system includes a television apparatus 100, an AV amplifier 200 serving as an audio apparatus, and a recorder 300 serving as a video player, which can be connected to each other. The video player may be a personal computer or a game machine. The television apparatus 100 is connected to the AV amplifier 200 with an HDMI cable that allows transmission and reception of audio data and control information, such as a CEC command. The audio data is transmitted from the AV amplifier 200 to the television apparatus 100 in one way, and the control information is transmitted and received in two ways. The television apparatus 100 and the AV amplifier 200 may be connected through a wireless communication interface, such as a wireless HDMI. The transmission of audio data from the television apparatus 100 to the AV amplifier 200 is performed through a digital audio cable, such as an optical digital audio cable or a coaxial digital audio cable. The recorder 300 and the AV amplifier 200 are also connected using the HDMI cable or the wireless communication unit.

FIG. 2 is a block diagram of the television apparatus 100. A tuner 101 receives a broadcast signal, performs decoding processing on a broadcast signal selected in accordance with a channel select instruction from a controller 109 to generate a transport stream (TS), and outputs it to a decoder 102.

The decoder 102 separates the TS into video data, audio data, and information data and decodes them individually. The decoded video data is output to an image processing section 112, and the decoded audio data is output to an audio processing section 103, respectively. That is, the audio data multiplexed in the broadcast signal is separated by a demultiplexer (not shown) into non-compressed data.

The audio processing section 103 performs audio processing, such as tone processing, such as processing of tone and a sense of realism, and volume processing on the decoded audio data, and outputs the processed audio data to an audio switching section 104. The audio processing also includes surround sound processing, such as pseudo surround sound processing, bass boost processing, and speech articulating processing.

The audio switching section 104 switches an audio-data output path in accordance with an instruction of the controller 109. The audio data is selectively output to a speaker output section 105, a headphone (or earphone) output section 106, or a digital-audio output section 107.

Audio data output to the speaker output section 105 is subjected to D/A conversion and amplifying processing and is output to a speaker connected to the television apparatus 100.

Audio data output to the headphone output section 106 is subjected to D/A conversion and amplifying processing and is output to a headphone terminal. The headphone output section 106 has a detector to detect the insertion and withdrawal of headphones. If the state of the insertion and withdrawal is changed, it notifies the controller 109 of it.

Audio data output from the audio switching section 104 is selectively input to the digital-audio output section 107 and is output from a digital-audio output terminal connected to the digital-audio output section 107.

Formats of audio data include pulse code modulation (PCM) and advanced audio coding (AAC). Audio data in a coded format may be directly output to the digital-audio output section 107 without passing through the decoder 102 and the audio processing section 103. The digital-audio output terminal refers mainly to an optical digital-audio output terminal or a coaxial digital-audio output terminal; however, it is not limited thereto. For example, it may be an analog output terminal, for example. The digital-audio output terminal is connected to the AV amplifier 200.

An HDMI interface 108 is an interface for connecting with an external device through the HDMI. It transmits and receives control information for external-device authentication, copy control, and external-device control and receives video data or audio data through a DDC line, a TDMS line, or a CEC line.

The controller 109 transmits and receives a CEC command for controlling an external device, in addition to usual TV control, such as channel selection and input switching, through the HDMI interface 108 on the basis of a remote-control code received by a remote-control receiver 110. With the use of the CEC command, a control to output sound from the speaker of the AV amplifier 200 is performed without using the speaker of the television apparatus 100. The controller 109 also performs audio-data-output-path switching control on the basis of the headphone insertion/withdrawal information sent from the headphone output section 105 and information stored in a memory 111. The memory 111 stores channel information, user setting information, etc. The user setting information includes information on the setting of a speaker that is given priority when viewing a broadcast program or playing content from the recorder 300. Examples of the speaker include a speaker connected to the television apparatus 100 and a speaker connected to the AV amplifier 200. The user setting information further includes headphone-inserting-operation setting information on whether to output sound only from the headphones by muting the speaker or from both of the speaker and the headphones. An image processing section 112 performs image processing on video data, such as contrast adjustment, color correction, outline correction, noise reduction, brightness correction, gray-level correction, edge enhancement, and white-balance correction.

A display 113 displays an image based on the video data processed by the image processing section 112. The display 113 may be disposed separately from the television apparatus 100.

FIG. 3 is a block diagram of the AV amplifier 200.

A digital-audio input section 201 inputs audio data output from the digital-audio output section 107 of the television apparatus 100.

A decoder 202 decodes encoded audio data.

An audio processing section 203 performs tone processing, surround sound processing, and volume processing on the audio data output from the decoder 202.

An audio switching section 204 switches an audio-data output path in accordance with an instruction of a controller 208. The audio data is selectively output to a speaker output section 205 or a headphone output section 206 by the audio switching section 204.

The speaker output section 205 performs D/A conversion and amplifying processing on the audio data output from the audio switching section 204 and outputs the audio data to the speaker connected to the AV amplifier 200. The sound can be normally output with a speaker of 5.1 channel or more. The speaker system generally includes left and right speakers, a rear speaker, a center speaker, and a subwoofer speaker.

A headphone output section 206 performs D/A conversion and amplifying processing on the audio data output from the audio switching section 204 and outputs the audio data to a headphone (or earphone) terminal at the AV amplifier 200.

An HDMI interface 207 is an interface for connecting with external devices through the HDMI. In this embodiment, the external devices are the television apparatus 100 and the recorder 3.

When the controller 208 receives an input switching CEC command from the television apparatus 100 through the HDMI interface 207, the controller 208 switches between audio data input through the HDMI interface 207 and audio data input through the digital-audio input section 201. Sound based on the switched audio data is output from the speaker system connected to the AV amplifier 200. In this embodiment, the audio data input through the HDMI interface 207 is audio data reproduced by the recorder 300, and the audio data input through the digital-audio input section 201 is audio data input from the television apparatus 100.

FIG. 4 is a block diagram of the recorder 300.

A disk drive 301 reads audio video data from various media. The media includes a DVD, a Blu-ray disc, and a hard disk.

When the audio data read by the disk drive 301 is encoded, a decoder 302 decodes the video audio/data.

A multiplexer 304 converts audio data output from an audio processing section 303 and video data output from an image processing section 306 into a format conforming to the HDMI standard individually to multiplex them.

An HDMI interface 305 is an interface for connecting with the AV amplifier 200 through the HDMI. The HDMI interface 305 conforms to the HDMI standard and obtains various device information from the television apparatus 100 or the AV amplifier 200 at a predetermined time, such as at playback. The device information is stored in the EDID memories disposed in the television apparatus 100 and the AV amplifier 200. The device information includes a corresponding display format, a corresponding sound format, and a lip synchronization format.

The image processing section 306 performs predetermined image processing on the video data.

A controller 307 controls the playback of the audio video data on the basis of a CEC command input through the HDMI interface 305 and device information.

FIG. 5 is a flowchart showing the operation of the television apparatus 100 when headphones are inserted into the television apparatus 100 when the recorder 300 is playing back audio video data.

The headphone output section 106 monitors a change of insertion/withdrawal of headphones into/from the headphone terminal during the operation of the television apparatus 100 (S301). If there is no change, the headphone output section 106 continues the monitoring. If there is a change, the headphone output section 106 sends the information on the insertion/withdrawal to the controller 109. If it is determined that the state of the insertion/withdrawal has changed, the controller 109 obtains user setting information from the memory 111 (S302). The user setting information obtained is audio output setting at the insertion of headphones. The user setting includes at least two settings below. One of them is a first setting for muting the speaker to output sound only to headphones when the headphones are inserted, and the other one is a second setting for outputting sound from both of the speaker and the headphones. The user setting information may be obtained, in addition to the time when headphones are inserted or withdrawn, for example, when the television apparatus 100 is turned on or when the user setting is updated. For wireless headphones, insertion/withdrawal of a transmitter may be monitored or on/off of the power source of the headphones may be monitored.

Thereafter, the controller 109 checks the state of audio output (S303). The state of audio output includes two states, that is, audio output from the television apparatus 100 and audio output from the AV amplifier 200. In the case of the audio output from the television apparatus 100, the controller 109 instructs the audio switching section 104 to switch the audio output. The audio switching section 104 switches the audio output from the television apparatus 100 from speaker output to headphone output in accordance with an audio output switching instruction, or alternatively, outputs sound also to the headphones in addition to the speaker in accordance with user setting (S304). In the case of the audio output from the AV amplifier 200, the controller 109 switches the speaker output from the AV amplifier 200 to the headphone output from the television apparatus 100, or alternatively, outputs sound also to the headphones in addition to the speaker in accordance with user setting (S305).

FIG. 6 is a flowchart for the TV-amplifier audio switching processing (S305). First, the flow of the television apparatus 100 side will be described. If it is determined that audio data from the AV amplifier 200 is output (S303), the controller 109 transmits an input-switching CEC command to the AV amplifier 200 connected thereto through the HDMI interface 108 (S401). Since the AV amplifier 200 has input audio data from the recorder 300, the AV amplifier 200 switches the input audio data to the audio data output from the digital-audio output section 107 of the television apparatus 100. That is, the audio video data output from the recorder 300 is input to the television apparatus 100 through the AV amplifier 200.

The controller 109 monitors the input of audio data from the HDMI interface 108 (S402). If the input of the audio data is detected, the controller 109 performs the process of outputting the audio data to the headphones (S403). The controller 109 switches input to the decoder 102 from the tuner 102 to the HDMI interface 108 and instructs the audio switching section 104 to output the audio data to the headphone output section 106. At the same time, the controller 109 also instructs the audio switching section 104 to output the audio data to the digital-audio output section 107. For a specification in which audio date is always output from the digital audio terminal of the television apparatus 100, the process of switching the output to the digital-audio output section 107 is not necessary. The controller 109 switches the processing in accordance with user setting information (S404). If the user setting is the second setting, this flow is terminated. If the user setting is the first setting, the controller 109 mutes the audio data output from the digital-audio output section 107 (S405). At that time, the output from the digital-audio output section 107 may not be muted, and the output of audio data from the speaker output section 205 may be muted by stopping the processing of audio data input to the AV amplifier 200.

Meanwhile, in the flow of the AV amplifier 200 side, the controller 208 receives the input-switching CEC command from the television apparatus 100 through the HDMI interface 207 (S406), and performs input switching processing according to the input command (S407).

Figure 7B:
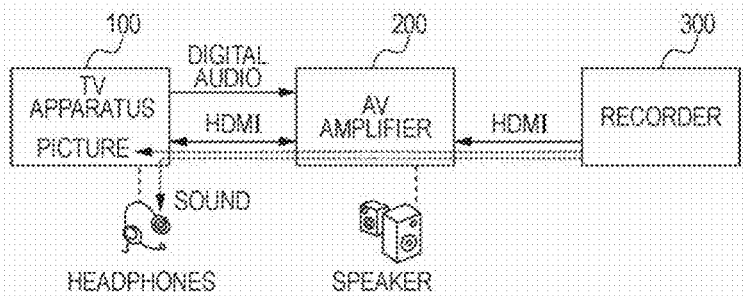
FIG. 7B is a diagram illustrating an audio transfer path according to the first embodiment of the present invention.
Figure 7C:
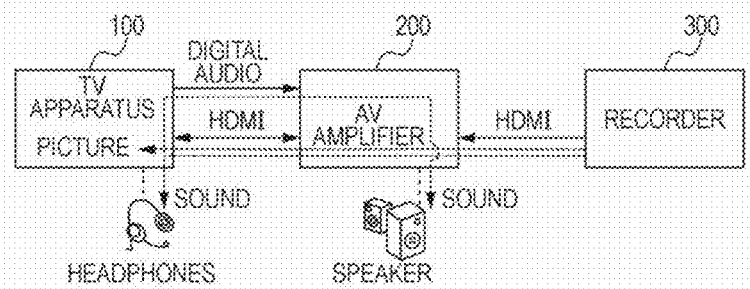
FIG. 7C is a diagram illustrating an audio transfer path according to the first embodiment of the present invention.
Figure 12A:
FIG. 12A is a schematic diagram showing a connection example of a television apparatus, an AV amplifier, and a recorder.
Figure 12B:
FIG. 12B is a schematic diagram showing a connection example of a television apparatus, an AV amplifier, and a recorder.

FIGS. 7A to 7C are diagrams showing changes in audio transfer path by the processes in FIGS. 5 and 6. FIG. 7A shows an audio output state before the headphones are inserted, schematically showing a state in which the audio data in the recorder 300 is output from the speaker connected to the AV amplifier 200. FIG. 7B shows an audio output state in the case where the user setting when the headphones are inserted is the first setting (only the headphones output). The AV amplifier 200 switches the audio input from the recorder 300 to the television apparatus 100 in accordance with the input switching CEC command from the television apparatus 100. Furthermore, the AV amplifier 200 sends the audio data input from the recorder 300 therethrough to the television apparatus 100. The television apparatus 100 receives the audio data from the recorder 300 through the AV amplifier 200 and outputs it to the headphones.

FIG. 7C shows an audio output state in which the user setting when the headphones are inserted is the second setting (both the speaker and the headphones output). The television apparatus 100 outputs the audio data received via the AV amplifier 200 to the headphones and outputs the same audio data from the digital-audio output terminal 107 to the AV amplifier 200. The AV amplifier 200 has come to a state in which it can input audio data from the digital-audio output terminal 107 in advance, so that it outputs sound based on the audio data from the speaker.

If the headphones are inserted into the AV amplifier 200, the audio data is output to the headphone output section 206 without the process of changing the path of the audio data described above, allowing listening with the headphones.

Thus, this embodiment allows sound listening with headphones irrespective of which of the television apparatus 100 and the AV amplifier 200 the headphones is inserted in. Furthermore, this embodiment uses a CEC command conforming to a standard. That is, it does not depend on a vender command; therefore, this can be achieved using various combinations of the television apparatus and the AV amplifier.

Second Embodiment

FIG. 8 is a configuration diagram of an AV system according to a second embodiment of the present invention. This is provided with a connection cable for transmitting audio data to be output from a center speaker of a television apparatus 400 from the AV amplifier 200. FIG. 9 is a block diagram of the television apparatus 400 according to the second embodiment of the present invention.

This embodiment is the same as the first embodiment except that it includes a center-speaker input section 414 (center-speaker input unit}. Center-speaker audio data is output from the AV amplifier 200 and is input through the center-speaker input section 414 connected to a center-speaker terminal. The audio data is subjected to predetermined signal processing by an audio processing section 403 and is output from a speaker output section 405 through an audio switching section 404.

FIG. 10 is a flowchart showing an operation when headphones are inserted into the television apparatus 400 according to this embodiment.

A headphone output section 406 monitors a change of insertion/withdrawal into/from the headphone terminal during the operation of the television apparatus 400 (S501). If there is no change, the headphone output section 406 continues the monitoring. If there is a change, the headphone output section 406 sends the information on insertion/withdrawal to a controller 409. If it is determined that the state of the insertion/withdrawal has changed, the controller 409 obtains user setting information, as in the first embodiment, from a memory 411 (S502). The user setting information may be obtained when the television apparatus 400 is turned on or when the user setting is updated.

The controller 409 checks the state of audio output as in the first embodiment (S503). In the case of audio output from the television apparatus 400, the controller 409 instructs the audio switching section 404 to switch the audio output. The audio switching section 404 switches the audio output from the television apparatus 400 from speaker output to headphone output, or alternatively, to headphone output in addition to the speaker output in accordance with a switching instruction (S504). In the case of audio output from the AV amplifier 200, the controller 409 determines whether audio data has been input from the center-speaker input section 414 (S505). The controller 409 switches the speaker output from the AV amplifier 200 to headphone output from the television apparatus 400, or alternatively, adds the above-described headphone output in addition to the above-described speaker output (S506). The flow of the TV-amplifier audio switching processing is the same as in the first embodiment. Furthermore, the controller 409 determines whether surround sound processing can be made or not depending on whether input from the center-speaker terminal is detected (S507). If no input signal from the center-speaker terminal is detected, then the process is terminated. In contrast, if an input signal from the center-speaker terminal is detected, the controller 409 determines that the surround sound had been output from the AV amplifier 200 before the headphones were inserted. Then, the controller 409 instructs the audio processing section 403 to perform surround sound processing on the audio data input through the HDMI interface 408 (S508). The surround sound processing here is pseudo surround sound processing which makes 2-channel sound output from the headphones be virtually heard as multiple-channel sound.

With this embodiment, a surround-sound effect that was given during listening with a speaker before headphones are inserted can be continued to listening with the headphones.

Third Embodiment

The configuration of an AV system according to a third embodiment of the present invention is the same as that of the first embodiment. Difference from the first embodiment is that audio processing in the television apparatus 100 is changed depending on whether audio data output from the AV amplifier 200 has been subjected to surround sound processing. FIG. 11 is a flowchart showing TV-amplifier audio switching processing of this embodiment in detail. The flow of the television apparatus 100 side will be described. If it is determined that audio data from the AV amplifier 200 has been output, the controller 109 sends an input-switching CEC command to the AV amplifier 200 connected thereto through the HDMI interface 108 (S601). The AV amplifier 200 has input audio data from the recorder 300. The television apparatus 100 issues the command for switching the input state of the AV amplifier 200 to input of audio data output from the digital audio terminal of the television apparatus 100.

The controller 109 obtains speaker output information from the AV amplifier 200 (S602). This process may be performed before step S601. The output information includes information on whether the audio data has been subjected to surround sound processing and information on whether sound is output from the speaker. If the controller 109 determines that the AV amplifier 200 outputs audio data subjected to surround sound processing from the speaker, then the controller 109 instructs the audio processing section 103 to perform surround sound processing (S604). The controller 109 monitors input of audio data from the HDMI interface 108 (S605). If input of audio data is detected, the controller 109 performs the process of outputting sound to the headphones (S606). The controller 109 switches the processing in accordance with user setting information, as in the first embodiment (S607).

Next, the flow of the AV amplifier 200 side will be described. When the controller 208 receives the input switching CEC command from the television apparatus 100 through the HDMI interface 207 (S609), the controller 208 performs input switching processing according to the command (S610). At that time, the controller 208 determines whether the audio data is subjected to surround sound processing (S611). If the audio data is subjected to the surround sound processing, the controller 208 sends the determination to the television apparatus 100 (S612). The other processing steps are the same as those of the first embodiment.

In this embodiment, the surround sound processing is performed in the audio processing section 103 of the television apparatus 100; however, it may be performed in the audio processing section 203 of the AV amplifier 200, and the audio data subjected to the surround sound processing may be transmitted to the television apparatus 100.

With this embodiment, the surround-sound effect that was given during listening with the speaker before headphones are inserted can be continued to listening with the headphones irrespective of whether a center speaker is connected.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-222021 filed on Aug. 29, 2008, which is hereby incorporated by reference herein in its entirety.

What is claimed is:

1. A receiving apparatus comprising:
    a connecting unit;
    an audio output unit; and
    a control unit that (a) performs a process for transmitting a predetermined command to a second device if a first device is connected to the connecting unit and audio data is not output by the audio output unit, (b) determines, using predetermined information received from the second device, whether or not the second device outputs first audio data, (c) performs a surround sound process on second audio data if the predetermined information indicates that the first audio data is subjected to surround sound processing by the second device, (d) performs a process for causing the first device to output third audio data if the predetermined information indicates that first audio data is subject to surround sound processing by the second device, and (e) performs a process for causing the first device to output the second audio data if the predetermined information does not indicate that audio data is subject to surround sound processing by the second device, wherein the predetermined command is used for requesting the second device to transmit audio data to the receiving apparatus, and wherein the first audio data includes audio data subjected to surround sound processing by the second device, the second audio data includes audio data received from the second device, and the third data is generated by subjecting surround sound processing to the second audio data.

2. A method for controlling a receiving apparatus, wherein the receiving apparatus includes a connecting unit and an audio output unit, the method comprising:
    performing a process for transmitting a predetermined command to a second device if a first device is connected to the connecting unit and audio data is not output by the audio output unit, wherein the predetermined command is used for requesting the second device to transmit audio data to the receiving apparatus;
    determining, using predetermined information received from the second device, whether or not the second device outputs first audio data;
    performing a surround sound process on second audio data if the predetermined information indicates that the first audio data is subjected to surround sound processing by the second device,
    performing a process for causing the first device to output third audio data if the predetermined information indicates that the first audio data is subject to surround sound processing by the second device; and
    performing a process for causing the first device to output the second audio data if the predetermined information does not indicate that audio data is subjected to surround sound processing by the second device, wherein the first audio data includes audio data subjected to surround sound processing by the second device, the second audio data includes audio data received from the second device, and the third audio data is generated by subjecting surround sound processing to the second audio data.

3. The receiving apparatus according to claim 1, wherein the control unit causes the second device to stop outputting audio data if the first device is connected to the connecting unit.

4. The receiving apparatus according to claim 1, further comprising a receiving unit that receives audio data from the second device based on HDMI (High Definition Multimedia Interface).

5. The receiving apparatus according to claim 1, further comprising a receiving unit that receives audio data from a playback device via the second device.

6. The receiving apparatus according to claim 1, wherein the control unit does not perform a process for transmitting the predetermined command to the second device if the first device is connected to the connecting unit and audio data is output by the audio output unit.

7. The receiving apparatus according to claim 1, wherein the first device includes a headphone.

8. The receiving apparatus according to claim 1, wherein the audio output unit includes a speaker.

9. The receiving apparatus according to claim 1, wherein the control unit does not perform a process for transmitting the predetermined command to the second device if the first device is not connected to the connecting unit and audio data is output by the audio output unit.

10. The receiving apparatus according to claim 1, further comprising a transmitting unit that transmits audio data to the second device.

11. The receiving apparatus according to claim 1, wherein the second device includes an AV amplifier.

12. The receiving apparatus according to claim 1, wherein the predetermined information indicates whether or not audio data is subjected to surround sound processing by the second device if a process based on the predetermined command is performed by the second device.

* * * * *